(12) United States Patent
Kolenchery et al.

(10) Patent No.: US 7,907,526 B2
(45) Date of Patent: Mar. 15, 2011

(54) TRAFFIC-TRIGGERED SETUP OF LABEL SWITCHED PATHS

(75) Inventors: Santosh Kolenchery, Cary, NC (US); Sumit Garg, Grapevine, TX (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 902 days.

(21) Appl. No.: 11/420,689

(22) Filed: May 26, 2006

(65) Prior Publication Data

US 2007/0274212 A1 Nov. 29, 2007

(51) Int. Cl.
H04L 12/26 (2006.01)
(52) U.S. Cl. ........................................ 370/232; 370/252
(58) Field of Classification Search .................. 370/232, 370/252, 230, 395.5, 395.21, 412, 468
See application file for complete search history.

(56) References Cited

U.S. PATENT DOCUMENTS

| | | | | |
|---|---|---|---|---|
| 7,184,434 | B2 * | 2/2007 | Ganti et al. | 370/389 |
| 7,203,169 | B1 * | 4/2007 | Okholm et al. | 370/232 |
| 7,450,507 | B2 * | 11/2008 | Tundlam et al. | 370/232 |
| 7,477,657 | B1 * | 1/2009 | Murphy et al. | 370/468 |
| 7,710,873 | B2 * | 5/2010 | Pulkka et al. | 370/235 |
| 2003/0039246 | A1 | 2/2003 | Guo et al. | |
| 2003/0067880 | A1 | 4/2003 | Ciruvolu | |
| 2003/0152084 | A1 * | 8/2003 | Lee et al. | 370/395.21 |
| 2003/0185217 | A1 * | 10/2003 | Ganti et al. | 370/395.5 |
| 2004/0090923 | A1 * | 5/2004 | Kan et al. | 370/252 |
| 2005/0007954 | A1 * | 1/2005 | Sreemanthula et al. | 370/229 |
| 2005/0198682 | A1 * | 9/2005 | Wright | 725/96 |
| 2007/0201375 | A1 * | 8/2007 | Hallinan et al. | 370/252 |

FOREIGN PATENT DOCUMENTS

WO WO 03/088593 A 10/2003

OTHER PUBLICATIONS

Multiprotocol Label Switching Architecture, E. Rosen, et.al., RFC 3031, IETF Network Working Group, Jan. 2001.
MPLS Label Stack Encoding, E. Rosen, et. al., RFC 3032, IETF Network Working Group, Jan. 2001.
Requirements for Traffic Engineering Over MPLS, D. Awduche, et. al., RFC 2702, IETF Network Working Group, Sep. 1999.
RSVP-TE: Extensions to RSVP for LSP Tunnels, D. Awduche et.al. RFC 3209, IETF Network Working Group, Dec. 2001.
Constrained Based LSP Setup Using LDP, B. Jamoussi et.al., RFC 3212, IETF Network Working Group, Jan. 2002.

* cited by examiner

Primary Examiner — Kwang B Yao
Assistant Examiner — Candal Elpenord

(57) ABSTRACT

An automated Label Switched Path (LSP) control mechanism in a packet-switched network. A metering device in an Ingress Label Edge Router (LER) determines whether a data rate for a packet flow class exceeds a predefined limit. If so, the metering device sends an LSP-setup message to a Multi-Protocol Label Switching (MPLS) signaling function for setting up an LSP. When a calculated long-term data rate falls below a second predefined limit, the metering device sends an LSP-teardown message to the MPLS signaling function, which tears down the LSP. Current LSP status information and Next-Hop Label Forwarding Entries (NHLFE) information are stored in an associated database.

15 Claims, 4 Drawing Sheets

TRAFFIC-TRIGGERED SETUP OF LABEL SWITCHED PATHS

CROSS-REFERENCE TO RELATED APPLICATIONS

NOT APPLICABLE

STATEMENT REGARDING FEDERALLY SPONSORED RESEARCH OR DEVELOPMENT

NOT APPLICABLE

REFERENCE TO SEQUENCE LISTING, A TABLE, OR A COMPUTER PROGRAM LISTING COMPACT DISC APPENDIX

NOT APPLICABLE

BACKGROUND OF THE INVENTION

The present invention relates to communication systems. More particularly, and not by way of limitation, the present invention is directed to a method and arrangement for setting up Label Switched Paths (LSPs), which ensures that LSP-setup for a particular class of flows is triggered only when sufficient load is offered for that class of flows.

Multi-Protocol Label Switching (MPLS) is a well established technology that enables a network to carry traffic belonging to a single Forwarding Equivalence Class (FEC) over connection-oriented Label Switched Paths (LSPs). Current implementations of MPLS architectures trigger LSP-setup either by explicit user configuration, by routing updates, or by signaling of a client across an MPLS User-to-Network Interface (UNI).

LSP-setup by explicit user configuration is achieved by the user explicitly configuring LSPs. LSP tunnels may be set up by signaling protocols such as Resource Reservation Protocol Traffic Extension (RSVP-TE) or Constrained based Label Distribution Protocol (CR-LDP). LSP tunnels are described in "Requirements for Traffic Engineering Over MPLS," D. Awduche, et. al., RFC 2702, IETF Network Working Group, September 1999. The RSVP-TE protocol is described in "RSVP-TE: Extensions to RSVP for LSP Tunnels," D. Awduche et. al. RFC 3209, IETF Network Working Group, December 2001. The CR-LDP protocol is described in "Constrained based LSP Setup using LDP," B. Jamoussi et. al., RFC 3212, IETF Network Working Group, January 2002. These three documents are hereby incorporated herein by reference.

A disadvantage of LSP-setup by explicit user configuration is that this approach is not very scalable. Although it is possible to map multiple traffic flows into the same LSP tunnel by mapping multiple FEC entries at the Ingress Label Edge Router (Ingress-LER) to the same Next-Hop Label Forwarding Entries (NHLFE), this needs to be explicitly configured. Also, this approach does not adapt well to changing network conditions and topologies. The approach also tends to tie up network resources on a more permanent basis or till the user un-configures the LSP.

LSP-setup by routing updates occurs when the service provider implementing an MPLS core allows triggering of an LSP-setup based on prefix advertisements of dynamic routing protocols such as Open Shortest Path First (OSPF) and Border Gateway Protocol (BGP). All traffic to these destination prefixes are carried by the LSPs that are set up.

A disadvantage of LSP-setup by routing updates occurs because the LSP-setup for each prefix carries all types of traffic to that destination. Since this mechanism is dependent on control information such as routing updates, the LSPs remain underutilized in the absence of traffic.

LSP-setup by signaling across an MPLS UNI can be triggered by client applications signaling across an MPLS UNI interface across a link between Customer Equipment and Provider Equipment boxes (i.e., a CE-PE link).

A disadvantage of LSP-setup by signaling across an MPLS UNI is that this approach is limited to applications where service providers set up LSPs to connect Customer Equipment (CE) boxes at different sites across their MPLS-capable network. Thus, the approach mandates a point of operation and is not generally applicable.

The current art needs an improved method and arrangement for setting up LSPs that overcomes the disadvantages of the prior art. The present invention provides such a method and arrangement.

BRIEF SUMMARY OF THE INVENTION

The present invention provides a mechanism to trigger LSP-setup by applying user policies to incoming traffic flows. This method conserves network resources and reduces LSP overhead by ensuring that LSPs are set up only when traffic demands it. By using incoming traffic information to trigger LSP-setup at an Ingress-LER, the invention alleviates shortcomings of traditional trigger mechanisms such as manual configuration and routing prefix updates. Most significantly, Label Switched Router (LSR) resources for LSP setup and management are utilized only when traffic is offered. Additionally, the present invention does not depend on an MPLS-UNI capable client nor is it limited to such scenarios. The present invention provides all the typical benefits of using an LSP for traffic over a service provider network, such as security and use of inexpensive fast LSP-capable switches in the core network. The invention provides fine control over the class of flows that map onto the LSP. It also allows establishment of LSPs that provide specific Diffserv behavior and bandwidth guarantees to an entire class of traffic flows with minimal configuration.

Thus, in one aspect, the present invention is directed to a method of setting up LSPs in a packet-switched network. The method includes determining whether a data rate for a packet flow class exceeds a predefined limit; and automatically executing an LSP-setup procedure for the packet flow class upon determining that the data rate for the packet flow class exceeds the predefined limit.

In another aspect, the present invention is directed to an arrangement for setting up LSPs in a packet-switched network. The arrangement includes a metering device in a data-plane for determining whether a data rate for a packet flow class exceeds a predefined limit; and means in a control plane for automatically executing an LSP-setup procedure for the packet flow class in response to a determination by the metering device that the data rate for the packet flow class exceeds the predefined limit.

In another aspect, the present invention is directed to an automated LSP control mechanism in a packet-switched network. The mechanism includes a metering device in an Ingress LER for determining whether a data rate for a packet flow class exceeds a predefined limit; and an MPLS signaling device for setting up an LSP when the data rate for the packet flow class exceeds the predefined limit, and for tearing down the LSP when the data rate for the packet flow class falls below the predefined limit. The mechanism also includes communication means for sending an LSP-setup message to the MPLS signaling device when the metering device determines the data rate for the packet flow class exceeds the predefined limit, and for sending an LSP-teardown message to the MPLS signaling device when the metering device determines the data rate for the packet flow class has fallen below the predefined limit.

BRIEF DESCRIPTION OF THE SEVERAL VIEWS OF THE DRAWINGS

In the following section, the invention will be described with reference to exemplary embodiments illustrated in the figures, in which.

DETAILED DESCRIPTION OF THE INVENTION

The present invention utilizes a new LSP-setup procedure in conjunction with standard filter rules and meter actions to classify and measure incoming traffic. The meter action output indicates when incoming traffic exceeds or falls below user specified thresholds. These events are fed into the newly constituted LSP-setup procedure that is responsible for triggering LSP establishment procedures when traffic exceeds a particular threshold value, and for triggering LSP tear-down when traffic falls below a particular threshold. Once the LSP is established, the LSP-setup procedure is also responsible for mapping subsequent matching traffic onto the new LSP. This method ensures that LSP-setup is triggered only when there is sufficient offered load for that class of flows.

The classification engine in a router (Ingress-LER in this case) consists of an ordered set of filter rules. Each filter rule consists of match conditions and corresponding actions. The match conditions may include specific or wildcard matches on layer 3 and layer 4 fields on IP packet headers as well as additional metadata provided by other blocks in the router's dataplane. The filter actions allow operators to effect packet processing functions (for example, policing the rate of user traffic, re-marking IP layer 3 header fields, and the like). The incoming data packet header may be checked against the match conditions in the ordered filter rule set either by a hash lookup or by using a Content Addressable Memory (CAM).

The LSP-setup filter action in the present invention requires the operator to specify the following configuration items:

1 Egress-LER identifier;
2 Signaling protocol for LSP setup. (i.e., RSVP-TE, CRLDP);
3 QoS parameters and a Map of Diffserv fields to ELSP bits or LLSP labels. (The user must specify these parameters or default values for them when configuring the LSP trigger action block. These parameters are applicable for traffic flows that require special QoS, or Diffserv treatment.); and
4 LSP protection mechanisms.

Figure 1:
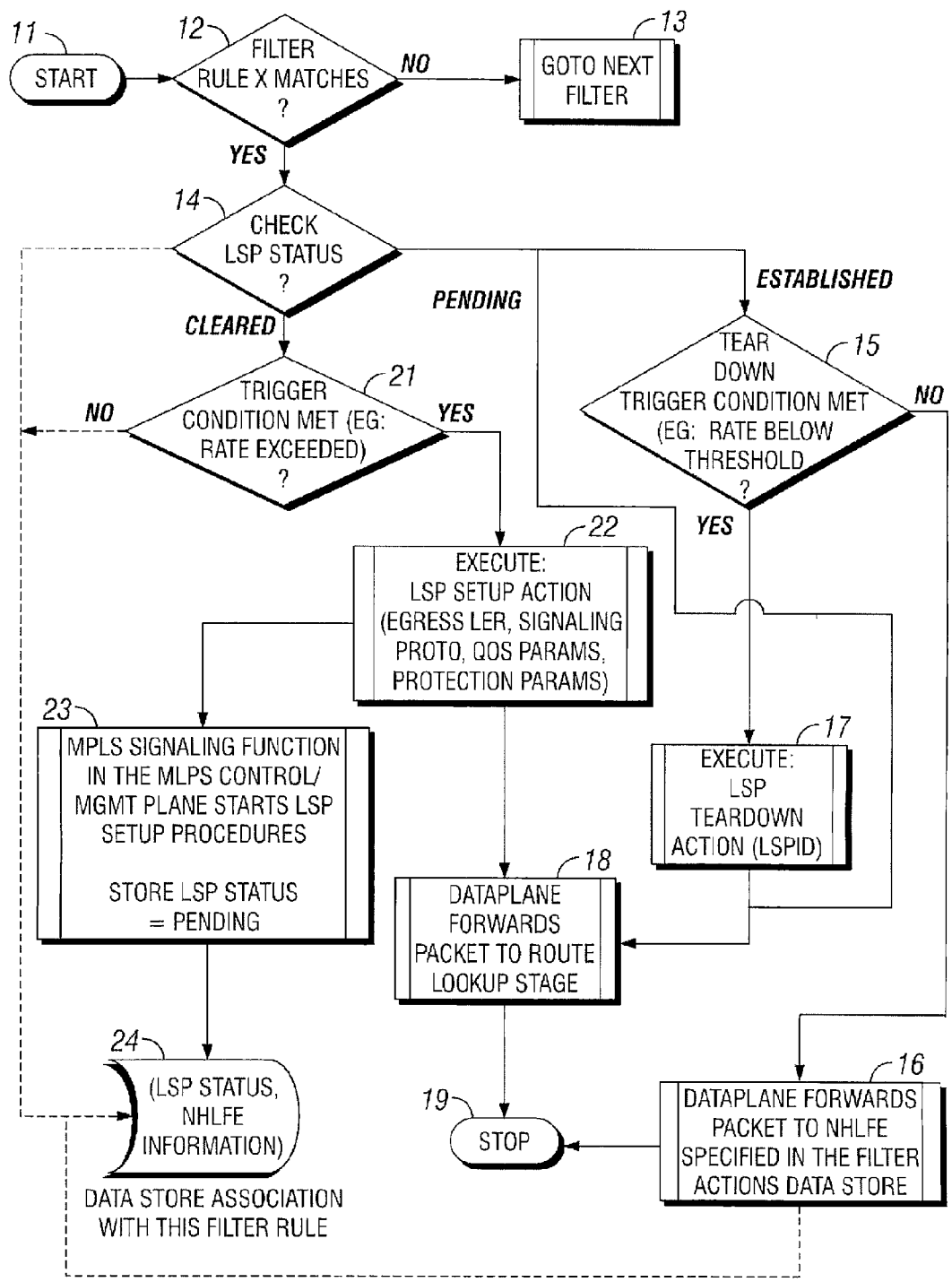
FIG. 1 is a flow chart illustrating the steps of an exemplary embodiment of a process performed in the dataplane when a packet arrives at an ingress interface in accordance with the teachings of the present invention.

FIG. 1 is a flow chart illustrating the steps of an exemplary embodiment of a process performed in the dataplane when a packet arrives at an ingress interface in accordance with the teachings of the present invention. The process starts at step 11 and moves to step 12 where it is determined whether filter rule X matches the received packet. The filter rule may be configured in the classification stage of an Ingress-LER to match traffic flows of interest. If it is determined that filter rule X does not match the received packet, the process moves to step 13 and goes to the next filter. If filter rule X matches the received packet, the process moves to step 14 and checks the current LSP status. If an LSP is already established, the process moves to step 15 where it is determined whether a teardown trigger condition is met (i.e., whether the flow rate is below a predefined threshold). If not, the process moves to step 16 where the dataplane forwards the packet to the NHLFE specified in the filter actions data store. However, if the teardown trigger condition is met, the process moves to step 17 where the LSP teardown action (LSPID) is performed. The process then moves to step 18 where the dataplane forwards the packet to the route lookup stage. The process then stops at step 19.

At step 14, it may also be determined that an LSP is currently pending. In this case, the process moves directly to step 18 where the dataplane forwards the packet to the route lookup stage. The process then stops at step 19.

At step 14, it may also be determined that the LSP has been cleared. In this case, the process moves to step 21 where it is determined whether the trigger condition for LSP-setup is met (i.e., whether the flow rate is above a predefined threshold). The first action block configured for the filter rule is a meter action that keeps track of incoming traffic statistics. When traffic matches the filter rule match conditions, the action associated with that filter rule is executed. For example, if the rate of incoming traffic exceeds a user-configured threshold value, the meter action block signals this event to the LSP-setup action block and the corresponding routine is executed. In this particular case, the process moves to step 22 where the LSP-setup filter action sends a trigger to the MPLS signaling function to trigger LSP-setup. The LSP-setup action procedure identifies an egress LER, signaling protocol, Quality of Service (QoS) parameters, and LSP protection parameters. The process then moves to step 23 where an MPLS signaling process in the MPLS control/management plane starts the LSP-setup procedures.

This routine sends appropriate events to the control plane of the Ingress-LER that initiate LSP-setup signaling procedures. Memory associated with the LSP-setup action block maintains data regarding the state of the triggered LSP. The control plane in the Ingress-LER updates this state field as the LSP-setup procedure progresses, by writing to the action's data store. The control plane also updates the Next-Hop Label Forwarding Entry (NHLFE) reference corresponding to the newly set up LSP in the action's data store.

At step 24, LSP status information and NHLFE information is stored in a database associated with the filter rule. Once the new LSP is established, the LSP Setup action block also maps subsequent incoming packets that match this filter to the NHLFE of the newly created LSP. From step 22, the process also moves to step 18 where the dataplane forwards the packet to the route lookup stage. The process then stops at step 19.

Figure 2:
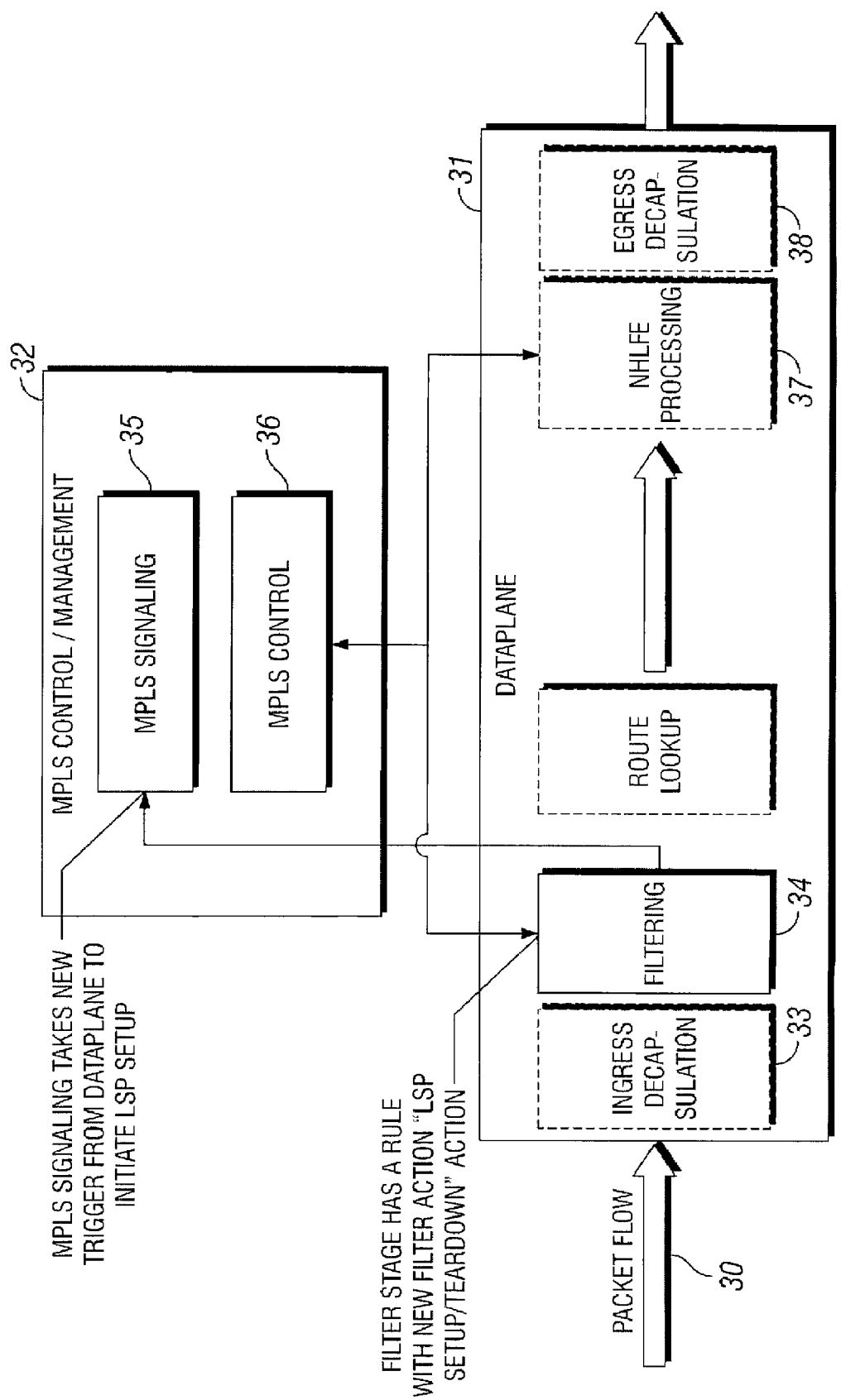
FIG. 2 is a simplified block diagram illustrating the interfaces between functions in the dataplane and functions in the control/management plane in an exemplary embodiment of the present invention.

FIG. 2 is a simplified block diagram illustrating the interfaces between functions in the dataplane 31 and functions in the control/management plane 32 in an exemplary embodiment of the present invention. A packet 30 received in the dataplane is first decapsulated in an ingress decapsulation function 33. Next, a filtering function 34 includes a rule with a new filter action entitled, "LSP Setup/Teardown" action. If the received packet matches the rule (i.e., a trigger condition is met), the filtering function notifies the MPLS signaling function 35 in the MPLS control/management plane. The MPLS signaling function starts the LSP-setup procedures. LSP status information is provided to the MPLS control function 36. NHLFE information is also updated in the NHLFE processor 37. The packet is then decapsulated in an egress decapsulation function 38.

Figure 3:
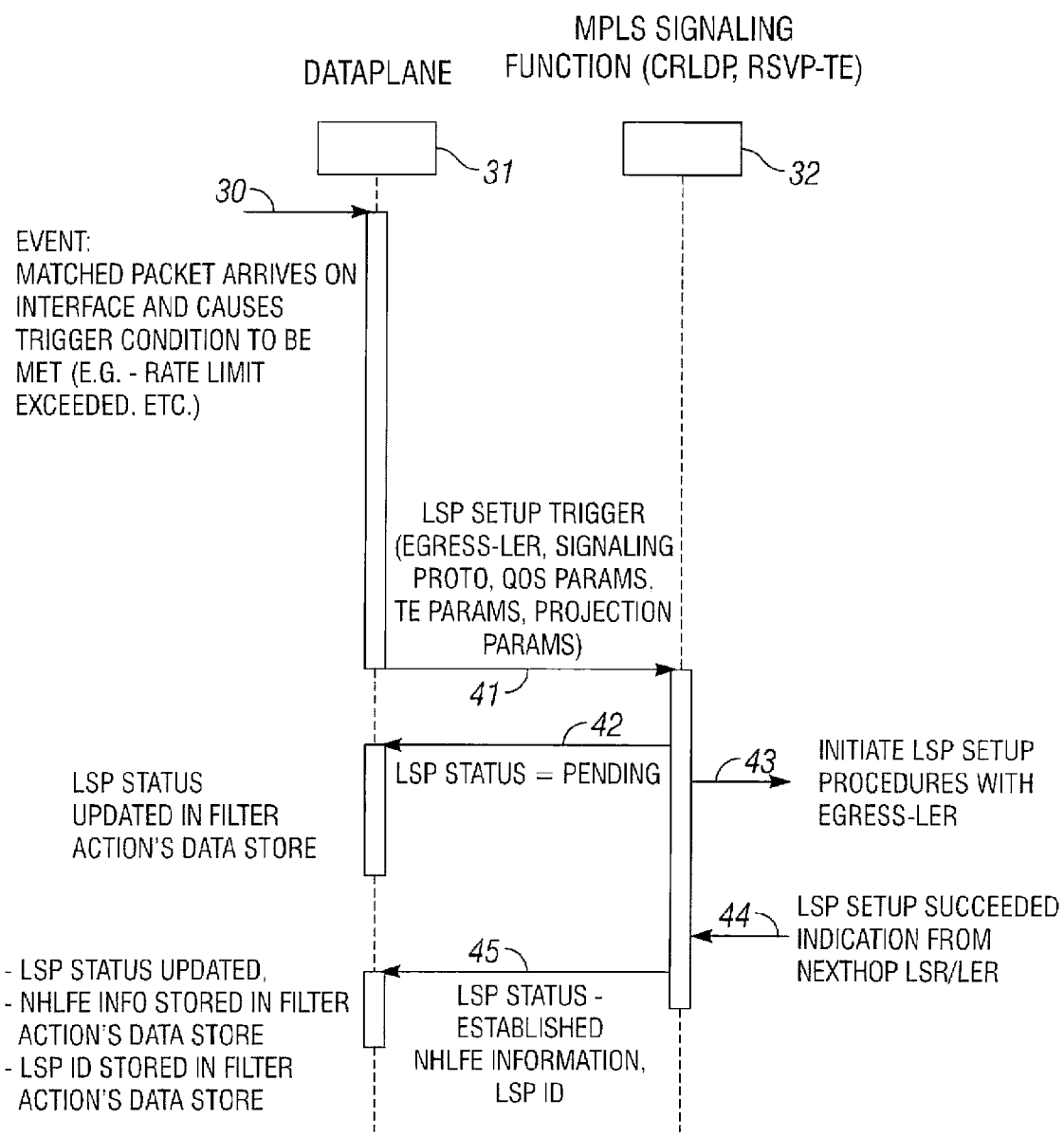
FIG. 3 is a signaling diagram illustrating the flow of messages between the dataplane and the control/management plane when an event triggers LSP-setup.

FIG. 3 is a signaling diagram illustrating the flow of messages between the dataplane 31 and the control/management plane 32 when an event 30 triggers LSP-setup. The triggering event may be the arrival of a matched packet on an interface to the dataplane, which causes a trigger condition to be met. For example, the packet may cause the rate limit to be exceeded. In response the dataplane sends an LSP-setup trigger message 41 to the control/management plane 32. In particular, the filtering function 34 sends the message to the MPLS signaling function 35. If the LSP status is not already "pending" or "established", the MPLS signaling function returns an LSP-status message 42 to the dataplane indicating the LSP status is "pending", and at step 43, the control function 36 initiates the LSP-setup procedure with the egress-LER. The signaling protocol, QoS parameters, traffic engineering (TE) parameters, and protection parameters are established during this procedure.

At step 44, the MPLS signaling function 35 receives an indication from a nexthop label switched router/label edge router (LSR/LER) that LSP-setup has succeeded. The MPLS signaling function then sends an LSP-status message 45 to the dataplane indicating the LSP status is "established". NHLFE information and an LSP ID are included in the LSP-status message. The dataplane forwards the packet to the NHLFE processor 37. The dataplane then updates the NHLFE information in the data store associated with the filter rule, and stores the LSP ID in the data store associated with the filter rule.

Figure 4:
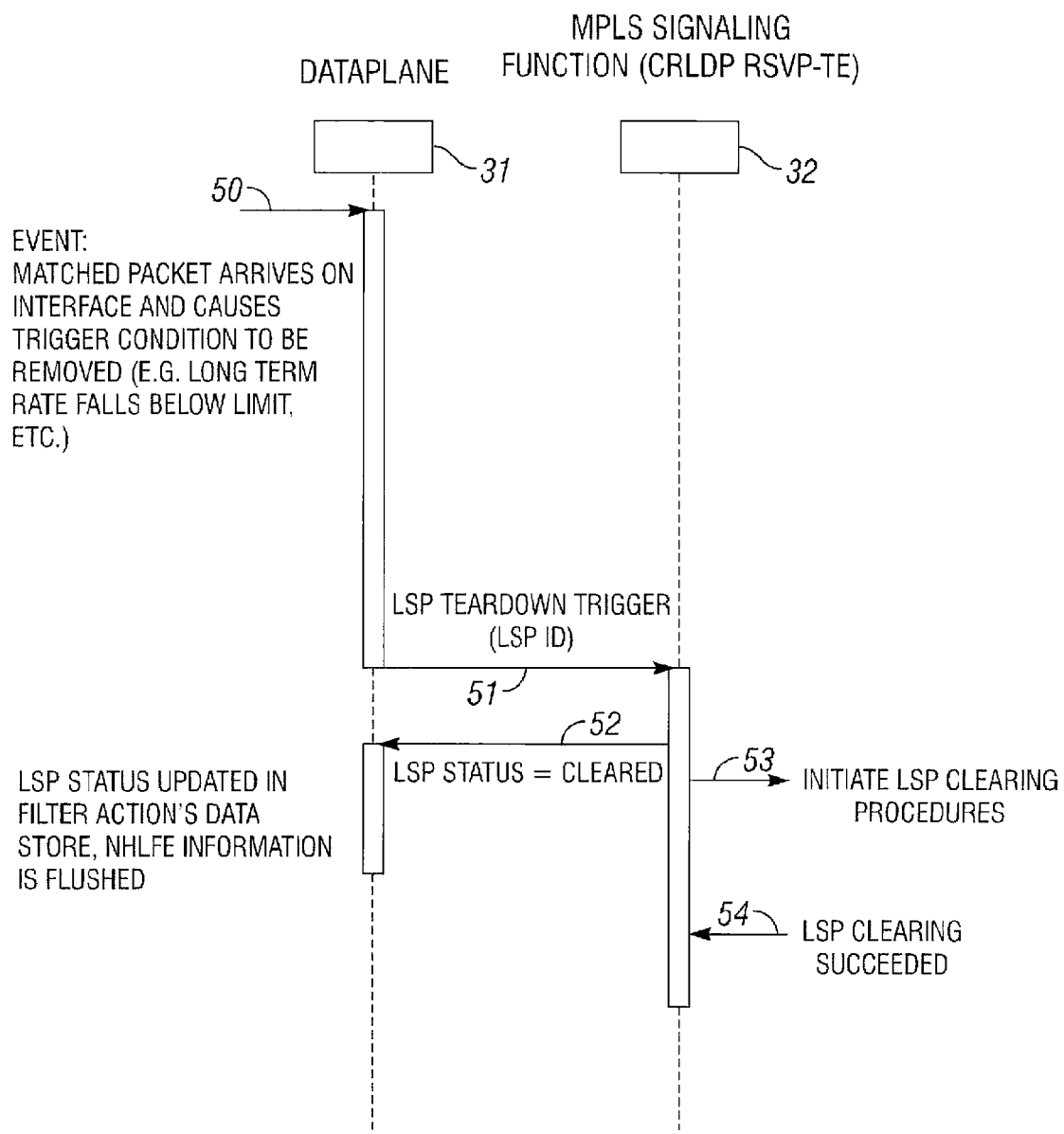
FIG. 4 is a signaling diagram illustrating the flow of messages between the dataplane and the control/management plane when an event triggers LSP-teardown.

FIG. 4 is a signaling diagram illustrating the flow of messages between the dataplane 31 and the control/management plane 32 when an event 50 triggers LSP-teardown. The triggering event may be the arrival of a matched packet on an interface to the dataplane, which causes a trigger condition to be removed. For example, the packet may cause the long-term data rate to fall below a predefined limit. The meter action block for the filter rule continuously keeps track of the offered load in this traffic class. When the traffic falls below another user-configured threshold, it will cause the LSP-setup action to initiate an LSP teardown by sending corresponding events to the control plane functions. After the LSP is cleared, the filter rule and the associated meter and LSP-setup actions continue processing as in FIG. 1.

In response the dataplane sends an LSP-teardown trigger message 51 to the control/management plane 32. In particular, the filtering function 34 sends the message to the MPLS signaling function 35, and includes the LSP ID in the message. If the LSP status is not already "cleared", the MPLS signaling function returns an LSP-status message 52 to the dataplane indicating the LSP status is "cleared". The LSP-status is updated in the data store associated with the filter rule, and the NHLFE information is flushed. At step 53, the control function 36 initiates the LSP clearing procedure with the egress-LER. At step 54, the MPLS signaling function receives an indication from the nexthop LSR/LER that LSP clearing has succeeded.

It should be noted that if automatic teardown is not desired, the process can be disabled by appropriate configuration of the LSP-setup action block. In this case, the LSP is retained until the user manually deletes the filter rule from the classification stage.

As will be recognized by those skilled in the art, the innovative concepts described in the present application can be modified and varied over a wide range of applications. Accordingly, the scope of patented subject matter should not be limited to any of the specific exemplary teachings discussed above, but is instead defined by the following claims.

What is claimed is:

1. A method of setting up Label Switched Paths (LSPs) for incoming packets in a packet-switched network, said method comprising: determining whether a data rate for a packet flow class associated with incoming packets exceeds a predefined limit at an ingress Label Edge Router (LER); and automatically executing an LSP-setup procedure for the packet flow class for said incoming packets upon determining that the data rate for the packet flow class exceeds the predefined limit; calculating a long-term data rate for the packet flow class; determining whether the long-term data rate falls below a second predefined limit sending an LSP-teardown message to a Multi Protocol Label Switching (MPLS) signaling device if the long-term data rate falls below the second predefined limit; automatically executing an LSP-teardown procedure for the packet flow class upon receiving the LSP teardown message; and forwarding said incoming packets to a forwarding entry specified in a data store when an LSP status is absent, for a cleared LSP, a trigger condition is below the predefined limit, or for an established LSP, a tear down trigger condition is above the second predefined limit.

2. The method according to claim 1, wherein the determining step includes:
receiving a packet in a dataplane filtering rule; and
determining by the dataplane filtering rule whether the received packet has caused the data rate to exceed the predefined limit.

3. The method according to claim 2, wherein the step of automatically executing an LSP-setup procedure includes:
sending an LSP-setup message from the filtering rule to a Multi-Protocol Label Switching (MPLS) signaling device in a control plane; and
initiating the LSP-setup procedure by the MPLS signaling device.

4. The method according to claim 3, wherein the step of initiating the LSP-setup procedure includes determining by the MPLS signaling device that an LSP is not already established or pending for the packet flow class.

5. The method according to claim 3, further comprising updating in the data store associated with the filtering rule, LSP status information and Next-Hop Label Forwarding Entries (NHLFE) information to reflect the newly set up LSP.

6. The method according to claim 1, further comprising:
determining whether a long-term data rate for a packet flow class falls below the second predefined limit; and
automatically executing an LSP-teardown procedure for the packet flow class upon determining that the long-term data rate for the packet flow class has fallen below the second predefined limit.

7. The method according to claim 6, further comprising updating in a data store associated with the filtering rule, LSP status information and Next-Hop Label Forwarding Entries (NHLFE) information to reflect the torn down LSP.

8. An arrangement for setting up Label Switched Paths (LSPs) for incoming packets in a packet-switched network, said arrangement comprising: a metering device in a dataplane for determining whether a data rate for a packet flow class associated with incoming packets exceeds a predefined limit; and means in a control plane for automatically executing an LSP-setup procedure for the packet flow class for said incoming packets in response to a determination by the metering device that the data rate for the packet flow class exceeds the predefined limit; means in the dataplane for forwarding said incoming packets to a forwarding entry specified in a data store when an LSP status is absent, for a cleared LSP, a trigger condition is below the predefined limit, or for an established LSP, a tear down trigger condition is above a second predefined limit; wherein the metering device also includes: means for calculating a long-term data rate for the packet flow class; means for determining whether the long-term data rate falls below the second predefined limit; and signaling means for sending an LSP-teardown message from the metering device to a Multi-Protocol Label Switching (MPLS) signaling device in the control plane if the long-term data rate falls below the second predefined limit; and wherein the MPLS signaling device automatically executes an LSP-teardown procedure for the packet flow class upon receiving the LSP-teardown message.

9. The arrangement according to claim 8, wherein the metering device is configured in an Ingress Label Edge Router (LER) and includes:
 means for receiving a packet in a packet flow; and
 means for determining whether the received packet has caused the data rate to exceed the predefined limit.

10. The arrangement according to claim 9, wherein the means for automatically executing an LSP-setup procedure includes:
 signaling means for sending an LSP-setup message from the metering device to a Multi-Protocol Label Switching (MPLS) signaling device in the control plane; and
 means within the MPLS signaling device for initiating the LSP-setup procedure.

11. The arrangement according to claim 10, wherein the means for initiating the LSP-setup procedure includes means for determining by the MPLS signaling device that an LSP is not already established or pending for the packet flow class.

12. The arrangement according to claim 10, wherein the data store stores LSP status information and Next-Hop Label Forwarding Entries (NHLFE) information.

13. An automated Label Switched Path (LSP) controller in a packet-switched network, said controller comprising:
 a metering device in an Ingress Label Edge Router (LER) for determining whether a data rate for a packet flow class associated with incoming packets exceeds a predefined limit;
 a Multi-Protocol Label Switching (MPLS) signaling device for setting up an LSP when the data rate for the packet flow class for said incoming packets exceeds the predefined limit, and for determining whether an LSP is already established and for tearing down the LSP when the data rate for the packet flow class falls below the predefined limit
 a dataplane of the Ingress LER for forwarding incoming packets to a forwarding entry specified in a data store when
  an LSP status is absent,
  for a cleared LSP, a trigger condition is below the predefined limit, or
  for an established LSP, a tear down trigger condition is above the predefined limit; and
 communication means for sending an LSP-setup message to the MPLS signaling device when the metering device determines the data rate for the packet flow class exceeds the predefined limit, and for sending an LSP-teardown message to the MPLS signaling device when the metering device determines the data rate for the packet flow class has fallen below the predefined limit.

14. The mechanism according to claim 13, wherein the MPLS signaling device includes means for determining that an LSP is not already established or pending for the packet flow class.

15. The mechanism according to claim 13, further comprising a data store for storing LSP status information and Next-Hop Label Forwarding Entries (NHLFE) information.

* * * * *

UNITED STATES PATENT AND TRADEMARK OFFICE
CERTIFICATE OF CORRECTION

| | | |
|---|---|---|
| PATENT NO. | : 7,907,526 B2 | Page 1 of 1 |
| APPLICATION NO. | : 11/420689 | |
| DATED | : March 15, 2011 | |
| INVENTOR(S) | : Kolenchery et al. | |

It is certified that error appears in the above-identified patent and that said Letters Patent is hereby corrected as shown below:

On the Title Page, Figure, for Tag "23", in Line 2, delete "MLPS" and insert -- MPLS --, therefor.

In Fig. 1, Sheet 1 of 4, for Tag "23", Line 2, delete "MLPS" and insert -- MPLS --, therefor.

In Column 1, Line 39, delete "Protocol" and insert -- Protocol: --, therefor.

Signed and Sealed this
Sixteenth Day of August, 2011

David J. Kappos
*Director of the United States Patent and Trademark Office*